United States Patent [19]

Kalnoki-Kis

[11] 4,277,545
[45] Jul. 7, 1981

[54] NONAQUEOUS CELL

[75] Inventor: Tibor Kalnoki-Kis, Westlake, Ohio

[73] Assignee: Union Carbide Corporation, New York, N.Y.

[21] Appl. No.: 147,218

[22] Filed: May 6, 1980

Related U.S. Application Data

[63] Continuation-in-part of Ser. No. 52,467, Jun. 27, 1979.

[51] Int. Cl.$^3$ .............................................. H01M 6/14
[52] U.S. Cl. ...................................... 429/48; 429/105; 429/194; 429/199
[58] Field of Search .................. 429/48, 194, 198, 199, 429/101, 105

[56] References Cited

U.S. PATENT DOCUMENTS

| Re. 22,065 | 4/1942 | Young | 429/149 |
| 3,928,067 | 12/1975 | Broadhead et al. | 429/194 |
| 3,928,070 | 12/1975 | Gunther | 429/194 |
| 3,993,501 | 11/1976 | Kalnoki-Kis | 429/48 |

FOREIGN PATENT DOCUMENTS 848855  9/1960  United Kingdom .

Primary Examiner—Anthony Skapars
Attorney, Agent, or Firm—Cornelius F. O'Brien

[57] ABSTRACT

A nonaqueous cell utilizing an active metal anode, such as lithium, a cathode collector and an ionically conductive cathode-electrolyte comprising a solute dissolved in a liquid cathode, such as an oxyhalide, and wherein a vinyl polymer is dissolved in the cathode-electrolyte.

14 Claims, No Drawings

NONAQUEOUS CELL

This application is a continuation-in-part of U.S. Pat. No. 052,467, filed June 27, 1979.

FIELD OF THE INVENTION

The invention relates to a nonaqueous cell employing an active metal anode, a cathode collector, an ionically conductive cathode-electrolyte comprising a solute dissolved in an active liquid cathode and wherein a vinyl polymer is dissolved in the cathode-electrolyte.

BACKGROUND OF THE INVENTION

The development of high energy battery systems requires, among other things, the compatibility of an electrolyte possessing desirable electrochemical properties with highly reactive anode materials, such as lithium or the like. The use of aqueous electrolytes is precluded in these systems since the anode materials are sufficiently active to react with water chemically. It has, therefore, been necessary in order to realize the high energy density obtainable through use of these highly reactive anodes to turn to the investigation of nonaqueous electrolyte systems.

The term "nonaqueous electrolyte" as used herein refers to an electrolyte which is composed of a solute, such as, for example, a metal salt or a complex salt of Group IA, Group IIA, Group IIIA or Group VA elements of the Periodic Table, dissolved in an appropriate nonaqueous solvent. The term "Periodic Table" as used herein refers to the Periodic Table of Elements as set forth on the inside back cover of the *Handbook of Chemistry and Physics*, 48th Edition, The Chemical Rubber Co., Cleveland, Ohio, 1967–1968.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a nonaqueous electrochemical cell. U.S. Pat. Nos. 3,475,226, 3,567,515 and 3,578,500 each disclose that liquid sulfur dioxide or solutions of sulfur dioxide and a co-solvent will perform this dual function in nonaqueous electrochemical cells. While these solutions perform their dual function, they are not without several disadvantages in use. Sulfur dioxide is always present and being a gas at ordinary temperatures, it must be contained in the cell as a liquid under pressure or dissolved in a liquid solvent. Handling and packaging problems are created if the sulfur dioxide is used alone, and an additional component and assembly step is necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

U.S. application Ser. No. 439,521 by G. E. Blomgren et al, filed Feb. 4, 1974, discloses a nonaqueous electrochemical cell comprising an anode, a cathode collector and a cathode-electrolyte, said cathode-electrolyte comprising a solution of an ionically conductive solute dissolved in an active cathode (depolarizer) wherein said active cathode (depolarizer) consists of a liquid oxyhalide of an element of Group V or Group VI of the Periodic Table. Although oxyhalides can be used effectively as a component part of a cathode-electrolyte in conjunction with an active metal anode, such as a lithium anode, to produce a good high energy density cell, it has been observed that if the cell is stored for a prolonged period of about three days or longer, passivation of the anode appears to occur which results in undesirable voltage delays at the beginning of discharge along with high cell impedance.

U.S. Pat. No. 3,993,501 to T. Kalnoki-Kis discloses one approach for minimizing or preventing undesirable voltage delays at the beginning of discharge of nonaqueous cells employing an oxyhalide-containing cathode-electrolyte by providing a vinyl polymer film coating on the surface of the anode that contacts the cathode-electrolyte. The disclosure made in this patent is incorporated herein by reference.

U.S. patent application Ser. No. 015,938 discloses a nonaqueous cell comprising an active metal anode, such as lithium, a liquid cathode-electrolyte comprising a solute dissolved in a solvent which is an oxyhalide of an element of Group V or Group VI of the Periodic Table and wherein elemental sulfur or a sulfur compound is incorporated into the cathode-electrolyte so as to substantially eliminate initial voltage delay of the cell during discharge. This disclosure is incorporated herein by reference.

One of the objects of this invention is to substantially prevent the passivation of the active metal anode in liquid cathode-electrolyte cells.

Another object of this invention is to provide a liquid cathode-electrolyte cell wherein a vinyl polymer is dissolved in the liquid cathode-electrolyte, so as to substantially prevent the passivation of the active metal anode during cell storage and usage.

Another object of this invention is to provide an oxyhalide cathode-electrolyte cell system wherein elemental sulfur or a sulfur compound is employed in the cathode-electrolyte as per the teachings of U.S. application Ser. No. 015,938 along with a vinyl polymer so as to effectively prevent the passivation of the active metal anode during cell storage and usage.

The foregoing and additional objects will become more fully apparent from the following description.

SUMMARY OF THE INVENTION

The invention relates to a high energy density nonaqueous cell comprising an active metal anode; a cathode collector; an ionically conductive cathode-electrolyte solution comprising a solute dissolved in an active liquid cathode (depolarizer) with or without a reactive or nonreactive co-solvent; and wherein a vinyl polymer is dissolved in the cell's cathode-electrolyte so as to lessen the duration of the voltage delay of the cell during discharge. The concentration of the vinyl polymer dissolved in the cathode-electrolyte should be between about 0.25 gram per liter and about 4.0 grams per liter of the cathode-electrolyte. Preferably, the concentration should be between 0.25 and 1.5 grams per liter and most preferably about 0.5 gram per liter. A concentration below 0.25 gram per liter is believed to be ineffective in meaningfully reducing the duration of the voltage delay upon initial discharge while a concentration above 4.0 grams per liter shows no effective improvement in further reducing the duration of the voltage delay upon initial discharge.

The vinyl polymeric materials suitable for use in accordance with this invention are normally solid vinyl polymers such as homopolymers of vinyl or vinylidene chloride, or copolymers containing vinyl chloride or vinylidene chloride having at least one of the following monomers copolymerized therein selected from the group consisting of vinyl esters, dibasic acids, diesters of dibasic acids and monoesters of dibasic acids. The term "copolymers" is used herein to mean mixed polymers or polyblends as well as heteropolymers formed from two or more unlike monomers polymerized together (reference: Concise Chemical and Technical Dictionary, 3rd Edition, H. Bennett, editor, Chemical Publishing Co., 1974).

General examples of suitable copolymers include combinations of vinyl chloride copolymerized with vinyl esters such as vinyl acetate and the like; vinyl chloride copolymerized with diesters of dibasic acids such as dibutyl maleate; vinyl chloride copolymerized with vinyl esters such as vinyl acetate and dibasic acids or mono- or diesters of dibasic acids such as maleic acid, or dibutyl- or monobutyl maleate. Specific examples are: a vinyl chloride-vinyl acetate copolymer containing 97% vinyl chloride—3% vinyl acetate; a vinyl chloride-vinyl acetate copolymer containing 86% vinyl chloride—14% vinyl acetate; a vinyl chloride-vinyl acetate-dibasic acid copolymer containing 86% vinyl chloride—13% vinyl acetate—1% maleic acid.

Suitable vinyl polymeric materials suitable for use in this invention are also disclosed in U.S. Pat. No. 4,141,870 which is incorporated herein by reference.

As used herein and as described in an article titled "Electrochemical Reactions In Batteries" by Akiya Kozawa and R. A. Powers in the *Journal of Chemical Education*—Vol. 49, pages 587 to 591, September 1972 edition, a cathode depolarizer is the cathode reactant and, therefore, is the material electrochemically reduced at the cathode. The cathode collector is not an active reducible material and functions as a current collector plus electronic conductor to the positive (cathode) terminal of a cell. In other words, the cathode collector is a situs for the electrochemical reduction reaction of the active cathode material and the electronic conductor to the cathode terminal of a cell.

An active liquid reducible cathode material (depolarizer) can either be mixed with a conductive solute which is a nonreactive material but is added to improve conductivity of the liquid active reducible cathode materials, or it can be mixed with both a conductive solute and a reactive or nonreactive co-solvent material. A reactant co-solvent material is one that is electrochemically active and, therefore, functions as an active cathode material while a nonreactive co-solvent material is one that is electrochemically inactive and, therefore, cannot function as an active cathode material.

A separator, if employed in the cell of this invention, would have to be chemically inert and insoluble in the liquid cathode-electrolyte and have a porosity so as to permit the liquid electrolyte to permeate through and contact the anode of the cell, thus establishing an ion transfer path between the anode and cathode. A suitable separator for use in this invention is a nonwoven or woven glass fiber mat.

Any compatible solid which is substantially electronically conductive will be useful as a cathode collector in the cells of the present invention. It is desirable to have as much surface contact as possible between the cathode-electrolyte and the collector. It is, therefore, preferred to employ a porous collector since it will provide a high surface area interface with the liquid cathode-electrolyte. The collector may be metallic and may be present in any physical form, such as a metallic film, screen or a pressed powder. Preferably, however, a pressed powder collector should be made at least partially of carbonaceous or other high surface area material.

The solute may be a simple or double salt which will produce an ionically conductive solution when dissolved in the solvent. Preferred solutes are complexes of inorganic or organic Lewis acids and inorganic ionizable salts. The main requirements for utility are that the salt, whether simple or complex, be compatible with the solvent being employed and that it yield a solution which is ionically conductive. According to the Lewis or electronic concept of acids and bases, many substances which do not contain active hydrogen can act as acids or acceptors of electron doublets. The basic concept is set forth in the chemical literature (*Journal of the Franklin Institute*, Vol. 266—July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity wnich is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

In accordance with the present invention, there is provided a nonaqueous electrochemical system comprising an active metal anode, a cathode collector, and a liquid cathode-electrolyte having dissolved therein a vinyl polymer, said cathode-electrolyte comprising a solute dissolved in an active reducible electrolyte solvent such as at least one oxyhalide of a Group V or Group VI element of the Periodic Table and/or a liquid halide of a group IV, V or VI element of the Periodic Table, with or without a cosolvent. The active reducible electrolyte solvent performs the dual function of acting as solvent for the electrolyte salt and as an active cathode (depolarizer) of the cell. The term "cathode-electrolyte" is used herein to describe electrolytes containing solvents that can perform this dual function.

The use of a single component of the cell as both an electrolyte solvent and active cathode (depolarizer) is a relatively recent development since previously it was generally considered that the two functions were necessarily independent and could not be served by the same material. For an electrolyte solvent to function in a cell, it is necessary that it contact both the anode and the cathode (depolarizer) so as to form a continuous ionic path therebetween. Thus it has generally been assumed that the active cathode material must never directly contact the anode and, therefore, it appeared that the two functions were mutually exclusive. However, it has recently been discovered that certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Although the active reducible liquid cathodes, such as the oxyhalides, inhibit the direct reaction of active metal anode surfaces sufficiently to permit them to act as both the cathode material and as the electrolyte carrier for nonaqueous cells, they do cause formation of a surface film on the active metal anode during cell storage particularly at elevated temperatures, which consists of a rather heavy layer of crystalline material. This crystalline layer appears to cause passivation of the anode which results in voltage delay on initial discharge along with high cell impedance values in the range of 11 to 15 ohms for a standard C-size cell.

The extent of anode passivation can be measured by observing the time required for the closed circuit voltage of the stored cell to reach its intended voltage level after discharge has begun. If this delay exceeds 20 seconds, the anode passivation would be considered excessive for most applications. What has been observed, for example, in lithium-oxyhalide cell systems is that after a load is applied across the terminals of the cell, the cell voltage immediately drops below the intended discharge level, then increases at a rate depending on temperature, the thickness of the crystalline layer, and the electrical load.

The exact composition of this layer is not known. The thickness and density of the crystalline layer as well as the size and shape of the crystals were observed to vary with the length of the storage period and also with the temperature during storage, e.g., at low temperatures there is relatively little growth of the crystalline layer as compared to the greater growth of the layer at higher temperatures of about 70° C. It has also been observed that when the oxyhalides, such as thionyl or sulfuryl chloride, are saturated with $SO_2$ and then placed in a lithium anode cell, a crystalline layer rapidly forms on the lithium surface thereby passivating the lithium.

In accordance with the present invention, it has been found that anode passivation can be substantially prevented by dissolving a vinyl polymer in the liquid cathode-electrolyte.

The vinyl polymer must remain stable in the liquid cathode-electrolyte and not effectively decrease the capacity of the cell during cell storage and discharge and in most cases will even increase the cell capacity on high rate discharge. Although the applicant does not want to be limited to any theory of invention, it appears that one reason why the vinyl polymers, e.g., vinyl chloride polymers, are stable in the oxyhalide cathode-electrolyte cell system, e.g., lithium-oxyhalide cell system, can be explained as follows. One of the accepted mechanisms of vinyl chloride polymer degradation is dehydrochlorination, i.e., the splitting off of a Cl atom and an H atom to form HCl. This process continues until the electronegativity of the remaining Cl atoms on the polymer is compensated for by the energy of conjugation (i.e., double bond formation) in the polymer. Further degradation then is postulated to take place by a free radical mechanism as follows:

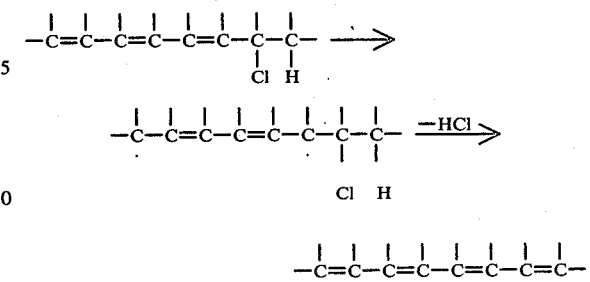

(·indicates free radical)

Most of the compounds which have been observed to interact or interfere with polymer degradation can be explained by the formation of radicals of the types R·, RO·, ROO· and atomic chlorine. The reaction mechanism by which $SO_2Cl_2$ decomposes is assumed to proceed by free radical formation, i.e., Cl· and $SO_2Cl·$ as disclosed in an article titled "The Mechanism of the Thermal Decomposition of Sulfuryl Chloride" by Z. G. Szabo and T. Bérces, Zeit. für Physikalische Chemie Neue Folge 12:168–195 (1952). Thus, following the principle of LeChatelier (chemical equilibrium), the stability of vinyl chloride polymers may be enhanced in such an environment as that prevailing in oxyhalide systems. In other words, if the concentration of any of the degradation products is increased, the reaction equilibrium will be shifted in favor of the original undegraded polymer.

Polymers for use in this invention must be capable of dissolving in the solvent or solvent and cosolvent of the cell's cathode-electrolyte and not decompose in the cathode-electrolyte. Although not all of the materials in the above group will have this characteristic, any artisan can easily select those that do by simply testing the vinyl polymer to see if it will dissolve in the intended liquid electrolyte solvent or solvent and co-solvent to be used. For example, polyethylene and polypropylene would not be suitable because they would decompose in liquid oxyhalide.

The effective range of concentration of the vinyl polymer in the cathode-electrolyte can vary between 0.25 and about 4.0 grams per liter and preferably between about 0.25 and about 1.5 grams per liter. A concentration below about 0.25 gram per liter in the cathode-electrolyte would be ineffective in substantially preventing the passivation of the active metal anode, such as lithium in a lithium-oxyhalide system, while a concentration above about 4.0 grams per liter would offer no additional protection and possibly also reduce cell discharge capacity.

The vinyl polymer can be dissolved directly in the solvent of the cell's cathode-electrolyte using any conventional technique. Thus, a vinyl polymer such as vinyl chloride prior to or subsequent to adding the ionic solute. A benefit of adding the vinyl polymer directly to the cathode-electrolyte over coating the anode is that it results in better control of the amount of vinyl polymer added to the cell. In addition, in the commercial production of cells, it is much easier to add the vinyl polymer to the cathode-electrolyte rather than coat the anode with a vinyl polymer film.

Suitable oxyhalides for use in this invention include sulfuryl chloride, thionyl chloride, phosphorus oxychloride, thionyl bromide, chromyl chloride, vanadyl tribromide and selenium oxychloride.

Useful organic co-solvents for use in this invention include the following classes of compounds:

Trialkyl borates: e.g., trimethyl borate, $(CH_3O)_3B$ (liquid range—29.3 to 67° C.)

Tetraalkyl silicates: e.g., tetramethyl silicate, $(CH_3O)_4Si$ (boiling point 121° C.)

Nitroalkanes: e.g., nitromethane, $CH_3NO_2$ (liquid range $-17°$ to 100.8° C.)

Alkylnitriles: e.g., acetonitrile, $CH_3CN$ (liquid range $-45°$ to 81.6° C.)

Dialkylamides: e.g., dimethylformamide, $HCON(CH_3)_2$ (liquid range $-60.48°$ to 149° C.)

Lactams: e.g., N-methylpyrrolidone,

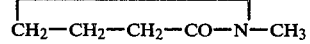
$CH_2-CH_2-CH_2-CO-N-CH_3$ (liquid range $-16°$ to 202° C.)

Tetraalkylureas: e.g., tetramethylurea, $(CH_3)_2N-CO-N(CH_3)_2$ (liquid range $-1.2°$ to 166° C.)

Monocarboxylic acid esters: e.g., ethyl acetate (liquid range $-83.6°$ to 77.06° C.)

Orthoesters: e.g., trimethylorthoformate, $HC(OCH_3)_3$ (boiling point 103° C.)

Lactones: e.g., α-(gamma)butyrolacetone,

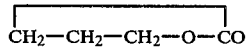
$CH_2-CH_2-CH_2-O-CO$ liquid range $-42°$ to 206° C.)

Dialkyl carbonates: e.g., dimethyl carbonate, $OC(OCH_3)_2$ (liquid range 2° to 90° C.)

Alkylene carbonates: e.g., propylene carbonate,

$CH(CH_3)CH_2-O-CO-O$ (liquid range $-48°$ to 242° C.) Monoethers: e.g., diethyl ether (liquid range $-116°$ to 34.5° C.)

Polyethers: e.g., 1,1- and 1,2-dimethoxyethane (liquid ranges $-113.2°$ to 64.5° C. and $-58°$ to 83° C., respectively)

Cyclic ethers: e.g., tetrahydrofuran (liquid range $-65°$ to 67° C.); 1,3-dioxolane (liquid range $-95°$ to 78° C.)

Nitroaromatics: e.g., nitrobenzene (liquid range 5.7° to 210.8° C.)

Aromatic carboxylic acid halides: e.g., benzoyl chloride (liquid range 0° to 197° C.); benzoyl bromide (liquid range $-24°$ to 218° C.)

Aromatic sulfonic acid halides: e.g., benzene sulfonyl chloride (liquid range 14.5° to 251° C.)

Aromatic phosphonic acid dihalides: e.g., benzene phosphonyl dichloride (boiling point 258° C.)

Aromatic thiophosphonic acid dihalides: e.g., benzene thiophosphonyl dichloride (boiling point 124° C. at 5 mm.)

Cyclic sulfones: e.g., sulfolane,

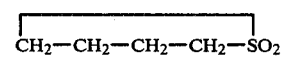
$CH_2-CH_2-CH_2-CH_2-SO_2$ (melting point 22° C.);

3-methylsulfolane (melting point $-1°$ C.)

Alkyl sulfonic acid halides: e.g., methanesulfonyl chloride (boiling point 161° C.)

Alkyl carboxylic acid halides: e.g., acetyl chloride (liquid range $-112°$ to 50.9° C.); acetyl bromide (liquid range $-96°$ to 76° C.); propionyl chloride (liquid range $-94°$ to 80° C.)

Saturated heterocyclics: e.g., tetrahydrothiophene (liquid range $-96°$ to 121° C.); 3-methyl-2-oxazolidone (melting point 15.9° C.)

Dialkyl sulfamic acid halides: e.g., dimethyl sulfamyl chloride (boiling point 80° C., 16 mm.)

Alkyl halosulfonates: e.g., ethyl chlorosulfonate (boiling point 151° C.)

unsaturated heterocyclic carboxylic acid halides: e.g., 2-furoyl chloride (liquid range $-2°$ to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range $-85.65°$ to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4° to 189° C.)

Dialkyl sulfates: e.g., dimethylsulfate (liquid range $-31.75°$ to 188.5° C.)

Dialkyl sulfites: e.g., dimethylsulfite (boiling point 126° C.)

Alkylene sulfites: e.g., ethylene glycol sulfite (liquid range $-11°$ to 173° C.)

Halogenated alkanes: e.g., methylene chloride (liquid range $-95°$ to 40° C.); 1,3-dichloropropane (liquid range $-99.5°$ to 120.4° C.).

Of the above, the preferred cosolvents are nitrobenzene; tetrahydrofuran; 1,3-dioxolane; 3-methyl-2-oxazolidone; propylene carbonate; α-butyrolactone; sulfolane; ethylene glycol sulfite; dimethyl sulfite and benzoyl chloride. Of the preferred cosolvents, the best are nitrobenzene; 3-methyl-2-oxazolidone; benzoyl chloride; dimethyl sulfite and ethylene glycol sulfite because they are more chemically inert to battery components and have long liquid ranges, and especially because they permit highly efficient utilization of the cathode materials.

It is also within this invention to employ inorganic solvents such as liquid inorganic halides of elements from Groups IV, V and VI of the Periodic Table, e.g., selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$), tin tribromide chloride ($SnBr_3Cl$), sulfur monochloride ($S_2Cl_2$), and sulfur dichloride ($SCl_2$). These halides, in addition to functioning as an electrolyte solvent in nonaqueous cells, can also function as an active reducible cathode thereby contributing to the overall active reducible material in such cells.

as VYNW), or a vinyl acetate/vinyl chloride copolymer containing 86 wt. % vinyl chloride and 14 wt. % vinyl acetate (obtained commercially from Union Carbide Corporation as VYHH) was dissolved in the cathode-electrolyte of some of the cells in the concentration shown in Table 1. After storage for about 5 days at room temperature the cells were tested for open circuit voltage (OCV); impedance (ohms); initial voltage on discharge across a 75-ohm load after 1 second; short circuit current (SSC); ampere-hour (amp-hr) discharge capacity on a 75-ohm load; and ampere-hour discharge capacity on a 250-ohm load. The data so obtained are shown in Table 1. As evident from the data shown, the cells employing the vinyl polymer in the cathode-electrolyte exhibited higher initial voltages after one second, higher short circuit currents and lower impedance.

TABLE 1

|  | No Additive Cell #1 | VYNW IN CATHODE-ELECTROLYTE (g/l) | | | | | | VYHH IN CATHODE-ELECTROLYTE 0.5 g/l Cell #8 |
|---|---|---|---|---|---|---|---|---|
|  |  | 0.25 Cell #2 | 0.5 Cell #3 | 1.0 Cell #4 | 2.1 Cell #5 | 4.2 Cell #6 | 8.4 Cell #7 |  |
| OCV (volts) | 3.70 | 3.69 | 3.69 | 3.69 | 3.69 | 3.69 | 3.69 | 3.70 |
| Impedance (ohms) | 8.3 | 7.5 | 6.9 | 7.6 | 6.4 | 6.0 | 5.7 | 8.1 |
| Voltage after 1 second - 75 ohm (volts) | 2.8 | 2.9 | 2.9 | 3.2 | 3.1 | 3.1 | 3.2 | 3.0 |
| SCC (amperes) | 0.6 | 2.1 | 2.8 | 2.1 | 2.0 | 1.7 | 2.7 | 1.4 |
| Amp.-hr. 75 ohms | 0.85 | 0.80 | 0.82 | 0.85 | 0.78 | 0.80 | 0.60 | 0.82 |
| Amp.-hr. 250 ohms | — | — | — | 1.36 | 1.32 | 1.26 | 1.22 | — |

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithiummagnesium, and intermetallic compounds such as lithium monoaluminide. The preferred anode materials are the alkali metals such as lithium, sodium and potassium, and alkaline earth metals such as calcium.

In the preferred embodiment, in selecting the particular oxyhalide for a particular cell in accordance with this invention one should also consider the stability of the particular oxyhalide in the presence of the other cell components and operating temperatures at which the cell is expected to perform. Thus an oxyhalide should be selected that will be stable in the presence of the other cell components.

In addition, if it is desired to render the electrolyte solution more viscous or convert it into a gel, a gelling agent such as colloidal silica may be added.

The following examples are illustrative of the present invention and are not intended in any manner to be limitative thereof.

EXAMPLE 1

Several 0.475 inch diameter cells were prepared employing a lithium anode, a carbonaceous cathode collector, a nonwoven glass fiber separator and a cathode-electrolyte comprising 1.5 M $LiAlCl_4$ in $SOCl_2$ with lithium sulfide and 3 volume percent $S_2Cl_2$. In addition, a vinyl acetate/vinyl chloride copolymer containing 97 wt. % vinyl chloride and 3 wt. % vinyl acetate (obtained commercially from Union Carbide Corporation

EXAMPLE 2

Several 0.75 inch diameter cells were prepared as in Example 1 except that in all the cells 0.5 gram per liter of VYNW was dissolved in the cathode-electrolyte. The average open circuit voltage for the cells was 3.69; the average impedance was 10.0 ohms; the average voltage after 1 second when discharged on a 75-ohm load was 2.83 volts; the average voltage after 5 seconds when discharged on a 75-ohm load was 3.19 volts; and the short circuit current was 1.2 amperes.

Three, four or five cells in each test lot were continuously discharged on either a 75-ohm load or a 250-ohm load, or discharged intermittently for four hours a day on either a 75-ohm or 250-ohm load. The average voltage, average ampere hours (amp-hrs) to a 2.7-volt cutoff and the average energy density in watt-hours per cubic inch ($Wh/in^3$) to a 2.7-volt cutoff are shown in Table II.

TABLE II

|  |  | Average Readings | | |
|---|---|---|---|---|
|  | Hours | Voltage (volts) | Amp-hours | Energy Density $Wh/in^3$ |
| 3 cells-continuous discharge across 75 ohms | 17.4 | 3.25 | 0.76 | 8.5 |
| 3 cells-intermittently discharged across 75 ohms for four hours a day | 18.5 | 3.25 | 0.80 | 9.0 |
| 4 cells-continuous discharge across 250 ohms | 89.2 | 3.40 | 1.21 | 14.3 |
| 5 cells-intermittently |  |  |  |  |

TABLE II-continued

| | | Average Readings | | |
|---|---|---|---|---|
| | Hours | Voltage (volts) | Amp-hours | Energy Density Wh/in$^3$ |
| discharged across 250 ohms for four hours a day | 101.4 | 3.40 | 1.38 | 16.1 |

EXAMPLE 3

Four test lots of five cells each were prepared as in Example 2. After storage for 1 month at 71° C., the twenty cells recorded an average open circuit voltage of 3.72 volts; an average impedance of 12.8 ohms; an average voltage after 1 second when discharged on a 75-ohm load of 2.5 volts; and a short circuit current of less than 0.1 ampere.

Each test lot of five cells was tested as shown in Table III and the average voltage, average ampere hours to a 2.7-volt cutoff and the average energy density in watt-hours per cubic inch to a 2.7-volt cutoff are shown in Table III.

TABLE III

| | | Average Readings | | |
|---|---|---|---|---|
| Test Conditions | Hours | Voltage (volts) | Amp-hours | Energy Density Wh/in$^3$ |
| Test Lot 1 - continuous discharge across 75 ohms | 14.9 | 3.19 | 0.63 | 6.9 |
| Test Lot 2 - intermittently discharged across 75 ohms for ½ hour a day | 15.1 | 3.19 | 0.64 | 7.1 |
| Test Lot 3 - continuous discharge across 250 ohms | 76.6 | 3.30 | 1.01 | 11.5 |
| Test Lot 4 - intermittently discharged across 250 ohms for 4 hours a day | 80.0 | 3.40 | 1.09 | 12.7 |

EXAMPLE 4

Several cells were prepared as in Example 2. After storage at 20° C. for six months, the cells recorded an average open circuit voltage of 3.71; an average impedance of 12.5 ohms; an average voltage after 1 second when discharged on a 75-ohm load of 1.9 volts and a short circuit current of less than 0.1 ampere.

While the present invention has been described with reference to many particular details thereof, it is not intended that these should be construed as limiting the scope of the invention.

What is claimed is:

1. A nonaqueous cell comprising an active metal anode; a cathode collector; an ionically conductive cathode-electrolyte solution comprising a solute dissolved in an active liquid cathode; and wherein a vinyl polymer is dissolved in the cathode-electrolyte.

2. The nonaqueous cell of claim 1 wherein the vinyl polymer is selected from the group consisting of homopolymers of vinyl or vinylidene chloride, and copolymers containing vinyl chloride or vinylidene chloride having at least one monomer copolymerized therein selected from the group consisting of vinyl esters, dibasic acids, diesters of dibasic acids and monoesters of dibasic acids.

3. The nonaqueous cell of claim 1 wherein the vinyl polymer is selected from the group consisting of vinyl chloride-vinyl acetate copolymers, vinyl chloride-vinyl acetate-dibasic acid copolymers and vinyl chloride homopolymers.

4. The nonaqueous cell of claim 1, 2 or 3 wherein the concentration of the vinyl polymer in the cathode-electrolyte ranges from about 0.25 to 4.0 grams per liter of the electrolyte.

5. The nonaqueous cell of claim 1, 2 or 3 wherein the concentration of the vinyl polymer in the cathode-electrolyte ranges from about 0.5 to 1.5 grams per liter of the electrolyte.

6. The nonaqueous cell of claim 1, 2 or 3 wherein the cathode-electrolyte contains a material selected from the group consisting of lithium sulfide, sulfur monochloride and mixtures thereof.

7. The nonaqueous cell of claim 1, 2 or 3 wherein the cathode-electrolyte contains at least one liquid oxyhalide selected from the group consisting of thionyl chloride, sulfuryl chloride, phosphorus oxychloride, thionyl bromide, chromyl chloride, vanadyl tribromide and selenium oxychloride.

8. The nonaqueous cell of claim 7 wherein the at least one liquid oxyhalide is selected from the group consisting of thionyl chloride and sulfuryl chloride.

9. The nonaqueous cell of claim 1, 2 or 3 wherein the anode is selected from the group consisting of lithium, sodium, calcium, potassium, and aluminum.

10. The nonaqueous cell of claim 7 wherein the cathode-electrolyte contains an inorganic cosolvent.

11. The nonaqueous cell of claim 7 wherein the cathode-electrolyte contains an organic cosolvent.

12. The nonaqueous cell of claim 7 wherein the anode is lithium and the liquid oxyhalide is thionyl chloride.

13. The nonaqueous cell of claim 7 wherein the anode is lithium and the liquid oxyhalide is sulfuryl chloride.

14. The nonaqueous cell of claim 1, 2 or 3 wherein the solute is a complex salt of a Lewis acid and an inorganic ionizable salt.

* * * * *